3,490,867
METHOD FOR PURIFYING CONCENTRATED AQUEOUS SOLUTION COMPRISED OF ZINC CHLORIDE
Fukusaburo Matsushita, Zenji Makita, and Suburu Sawaguchi, Shizuoka Prefecture, Japan, assignors to Toho Beslon Kabushiki Kaisha, Tokyo, Japan, a corporation of Japan
No Drawing. Filed Nov. 7, 1967, Ser. No. 681,108
Claims priority, application Japan, Nov. 13, 1966, 41/74,788
Int. Cl. C01g 9/04
U.S. Cl. 23—97                    10 Claims

ABSTRACT OF THE DISCLOSURE

This invention contemplates using a minimum amount of an oxidizing agent in the presence of a colloidal suspension of ferric hydroxide to effectively remove impurities such as iron contained in a concentrated aqueous solution as a solvent for a spinning solution of acrylonitrile polymer, which impurities adversely affect the polymerization rate and molecular weight of the polymer obtained and cause the undesirable discoloration of the produced fiber.

---

This invention relates to the treatment of an aqueous concentrated solution comprised mainly of zinc chloride for the removal of iron as an impurity.

Hitherto, concentrated aqueous salt solutions of mainly zinc chloride have been well-known as a solvent for polymerization or copolymerization of acrylonitrile and for spinning to produce acrylic fibers and, in fact, it has been so used commercially.

However, zinc chloride of a commercial grade usually contains metal impurities such as iron compounds. In addition, when the salt solution is repeatedly used as a solvent for polymerization and spinning, it is eventually contaminated with iron ion during the process operations.

The existence of iron in the salt solution affects the polymerization rate and the molecular weight of the polymer obtained and causes an undesirable discoloration of the produced fiber. It is therefore necessary to remove iron ion from the salt solution so as to avoid the undesirable effects.

It is an object of the present invention to provide a salt solution which can be repeatedly used without any troubles for polymerization or spinning of acrylonitrile polymer.

The new method comprises adjusting the concentration of basic compounds in the salt solution to be treated to a level of at least 0.15 weight percent as calculated in terms of zinc oxide, adding a colloidal suspension of ferric hydroxide to the solution, oxidizing the iron ion contained in the solution by using an oxidizing agent, and filtering the thus treated solution to remove the produced precipitate.

The salt solution to be treated is a concentrated aqueous solution of zinc chloride alone or a salt mixture of mainly zinc chloride together with one or more of sodium chloride, magnesium chloride, ammonium chloride and the like.

The term acrylonitrile polymer as employed hereinafter means both a homopolymer of acrylonitrile and also a copolymer containing at least 80% by weight of acrylonitrile. Such copolymers are the products of copolymerization of acrylonitrile with other monoethylenically unsaturated monomers such as methylacrylate, methyl methacrylate, vinyl acetate, acrylamide, allyl sulfonic acid or its salts and methallyl sulfonic acid or its salts.

Various method are known for removing metal impurities from the salt solution. For example, U.S. Patent No. 2,746,840 teaches the use of water soluble persulfate and U.S. Patent No. 3,148,944 the use of potassium permanganate respectively as the oxidizer. However, it has been found that, in the case of these methods, a comparatively large amount of oxidizing agent is required to remove iron ion effectively. The consumption of a large amount of oxidizing agent is not only uneconomical because they are generally expensive, but also causes an undesired change of the salt composition in the salt solution because of the existence of residual ions namely potassium ion, sodium ion, sulfate ion or the like produced by the decomposition of the oxidizing agents. Some of these ions may hinder the solvent power of the salt solution.

Therefore, another expedient for removing such undesirable ions coming from the oxidizing agent is desirable if constancy of the salt composition is required in order to keep reproducible polymerization and spinning during recycling operations. According to this invention, a small amount of oxidizing agent is enough for the removal of iron ion from the salt solution. Thus, the process for removing any resdiual ions coming from decomposition of the oxidizing agent may be omitted or simplified.

In determining the concentration of the basic compounds, the salt solution is diluted to a salt concentration of 20 g./225–250 ml. before the solution is titrated with hydrochloric acid. A mixture of xylenecyanol and methyl orange is used as an indicator for the titration.

The concentration of basic compounds is calculated in terms of zinc oxide from the amount of hydrochloric acid used.

Although there is a close correlation between the pH value of the salt solution and the concentration of the basic compounds, the evaluation on the concentration of the basic compounds by the determination of pH value is not very accurate because the pH value also depends on the salt concentration and the salt composition of the salt solution.

According to this invention, the concentration of basic compounds should be adjusted to at least 0.15% by weight preferably in the range of 0.20–0.50% by weight as calculated in terms of zinc oxide. The basic compound to be added to the salt solution for adjusting the concentration of basic compounds is selected from such compounds as zinc oxide, zinc carbonate or sodium hydroxide. When the concentration of the basic compounds is less than 0.15% by weight, satisfactory results can not be obtained.

On the other hand, a higher concentration of basic compounds than 0.5% by weight is unnecessary because precipitates of the basic compounds may come out in the salt solution or the salt composition may change unnecessarily.

Hydrogen peroxide, water soluble persulfates such as ammonium persulfate or sodium persulfate and oxy-salts of chlorine such as sodium chlorite or sodium hypochlorite are employed as the oxidizing agent.

Above all, hydrogen peroxide is the most useful oxidizing agent from the viewpoint of decomposition products. The amount of oxidizing agent required in this invention is at least 0.01% by weight, preferably more than 0.05% by weight.

A major advantage of this invention is based on the fact that the removal of iron ion is carried out by using a comparatively little amount of oxidizing agent.

As mentioned previously, it is well-known that metal ion impurities in the salt solution can be removed by oxidation. But, a considerable amount of oxidizing agent is required in the case of the known methods referred to above. For example, according to our experiments, more than 0.4% by weight was necessary to obtain good results in the case of sodium persulfate and more than 0.6% by weight in the case of sodium hypochlorite and inferior results were detected in the case of hydrogen peroxide.

The addition of a colloidal suspension of ferric hydroxide plays an important role in this invention. The addition of even as much as 0.4% by weight of hydrogen peroxide gives little effect on the removal of iron ion, if the colloidal suspension of ferric hydroxide is not added prior to the oxidation of the iron ion.

The colloidal suspension of ferric hydroxide is added simultaneously with or prior to the addition of the oxidizing agent. The colloidal suspension of ferric hydroxide is mixed into the adjusted solution in an amount equivalent to at least $1.0 \times 10^{-4}\%$ based on the weight of the adjusted solution in respect of the iron content in said colloidal suspension. The colloidal suspension is aged for at least 20 hours after its preparation.

The colloidal suspension of ferric hydroxide is prepared by the addition of an aqueous sodium hydroxide solution of a concentration of less than 5% by weight to an aqueous ferric chloride solution of a concentration of less than 1.5% by weight or by the addition of ferric chloride to boiling water. The use of ferrous compounds should be avoided because it produces a rather bad effect.

The aging of the colloidal suspension for at least 20 hours before using has been found to be necessary to obtain good results. However, a colloidal suspension of ferric hydroxide prepared by other procedures is not always effective, perhaps, because of a different state of colloidal suspension.

The oxidation of iron ion is carried out in the presence of colloidal ferric hydroxide at a temperature preferably higher than 50° C.

The higher the temperature, the faster the oxidation proceeds.

It is preferred to keep the treated solution at the oxidation temperature longer in order to facilitate the filtration of the precipitate.

After the oxidation, the solution is cooled to about 40° C. and filtered with a suitable filter so as to separate the precipitates occluding iron compounds.

Thus, after the adjustment of the salt concentration, the salt solution thus treated can be reasonably used as the solvent for polymerization and spinning of acrylonitrile polymer.

The invention will be further described in the following examples.

Percentages as given in the examples indicate percent by weight.

EXAMPLE 1

An aqueous salt solution comprised of 54% zinc chloride and 4% sodium chloride, which contained $2.8 \times 10^{-4}\%$ of iron ion as an impurity, was subjected to purification.

Firstly, the concentration of basic compounds in the salt solution was adjusted to 0.35% by adding zinc oxide and the solution was heated to 90° C., and by adding 0.07% of hydrogen peroxide and $1.0 \times 10^{-2}\%$ of a colloidal suspension of ferric hydroxide, oxidation was carried out for 60 minutes.

The colloidal suspension of ferric hydroxide was prepared by a procedure in which 20 l. of a 3.1% aqueous sodium hydroxide solution was added to 52.1 of an 0.88% aqueous ferric chloride solution at room temperature and then aged for 20 hours.

The thus prepared colloidal suspension contains 0.3% of ferric hydroxide as calculated in terms of the iron component.

After the oxidation, the salt solution was cooled to 40° C. and filtered by using Celite as a filtering aid.

Only $0.6 \times 10^{-4}\%$ of iron was detected in the salt solution thus obtained, i.e. about $2.2 \times 10^{-4}\%$ of iron was removed by the above treatment.

On the other hand, without the addition of the colloidal suspension of ferric hydroxide, the removal of iron was not attained even as much as 0.4% of hydrogen peroxide is added to the oxidizing agent.

Inferior results were also observed when the colloidal suspension of ferric hydroxide was added after the addition of the oxidizing agent.

Only $0.7 \times 10^{-4}\%$ of iron was removed in such a case instead of the $2.2 \times 10^{-4}\%$ removal attained in the method of this invention.

Thus, it is apparent that the addition of the colloidal suspension of ferric hydroxide plays an essential role in this invention.

EXAMPLE 2

An aqueous 57% zinc chloride solution containing $3.12 \times 10^{-4}\%$ of iron ion as an impurity was subjected to a continuous purification treatment at a feeding rate of 100 volume units per hour.

After adjusting the concentration of the basic compounds to 0.35% by the addition of zinc carbonate, the salt solution was fed into a glass-lined reaction vessel of 110 volume units capacity which was kept at 90° C. by heating with a steam jacket.

0.16 volume unit per hour of aqueous 50% hydrogen peroxide was also fed into the vessel simultaneously with 0.21 volume unit per hour of colloidal suspension of ferric hydroxide.

The colloidal suspension of ferric hydroxide was prepared by the same procedure as described in Example 1.

While being continuously removed from the vessel, the solution was cooled to 40.3° C. and then filtered using a filter precoated with Celite.

The salt solution thus obtained contained $0.96 \times 10^{-4}\%$ of iron in average, i.e. about $2.16 \times 10^{-4}\%$ of iron was removed by the treatment.

EXAMPLE 3

An aqueous salt solution comprised of 54.5% zinc chloride and 3.8% sodium chloride contained $$3.06 \times 10^{-4}\%$$

of iron ion as an impurity.

After zinc oxide and sodium hydroxide were added so as to adjust the concentration of the basic compounds to 0.4% as calculated in terms of zinc oxide, the salt solution was oxidized at 90° C. for 60 minutes with 0.01% sodium persulfate based on the weight of the salt solution in the presence of colloidal ferric hydroxide.

The colloidal suspension was prepared by a method in which 2 l. of an aqueous 38% solution of ferric chloride was poured into 71.5 l. of boiling water.

After the oxidation, the salt solution was filtered at 40° C. The resulting solution contained $0.87 \times 10^{-4}\%$ of iron ion, i.e., $2.19 \times 10^{-4}\%$ of iron ion was removed.

On the other hand, while the addition of the colloidal suspension of ferric hydroxide was omitted, only $$0.21 \times 10^{-4}\%$$

of iron ion could be removed and more than 0.6% sodium persulfate based on the weight of the salt solution was required to remove from the iron ion effectively.

EXAMPLE 4

When 0.09% of sodium hypochlorite based on the weight of the salt solution was used instead of the persulfate in Example 3, $1.13 \times 10^{-4}\%$ of iron ion was detected in the resulting solution. When the addition of ferric hydroxide was omitted, 0.6% of sodium hypochlorite was required to reduce the concentration of iron ion to $1.67 \times 10^{-4}\%$.

What is claimed is:

1. A method for removing iron ions from a concentrated aqueous salt solution comprising mainly zinc chloride, said method comprising:
  (a) adjusting the concentration of basic compounds in the salt solution to at least 0.15% by weight calculated in terms of zinc oxide,
  (b) mixing with the thus adjusted salt solution a colloidal suspension of ferric hydroxide which has been aged for at least 20 hours in an amount equivalent to at least $1.0 \times 10^{-4}\%$ based on the weight of the adjusted salt solution in respect of the iron content in said colloidal suspension,
  (c) mixing with the salt solution to which the aged colloidal suspension of ferric hydroxide has been added, an oxidizing agent in an amount of at least 0.01% based on the weight of the adjusted solution; and
  (d) filtering the thus treated salt solution to remove the produced precipitates.

2. The method as claimed in claim 1 wherein the concentrated aqueous salt solution contains mainly zinc chloride together with at least one member of the group consisting of sodium chloride, calcium chloride and ammonium chloride.

3. The method as claimed in claim 1 wherein the concentration of the basic compound is in the range of 0.2–0.5% by weight as calculated in terms of zinc oxide.

4. The method as claimed in claim 1 wherein the concentration of the basic compounds is adjusted by adding a compound selected from a group consisting of zinc oxide, zinc carbonate and sodium hydroxide to the salt solution.

5. The method as claimed in claim 1 wherein the oxidizing agent is selected from the group consisting of hydrogen peroxide, water soluble persulfates and salts of oxy-acids of chlorine.

6. The method as claimed in claim 1 wherein the colloidal suspension of ferric hydroxide is prepared by adding an aqueous solution of ferric chloride to boiling water.

7. The method as claimed in claim 1 wherein the aged colloidal suspension of ferric hydroxide is added in an amount of more than $2.0 \times 10^{-4}\%$.

8. The method as claimed in claim 1 wherein oxidizing is effected at a temperature higher than 50° C.

9. The method as claimed in claim 8 wherein oxidizing is effected more than 30 minutes.

10. The method as claimed in claim 5, wherein the water soluble persulfate is sodium persulfate or ammonium persulfate and the salts of oxy-acid of chlorine are sodium chlorite and sodium hypochlorite.

References Cited

UNITED STATES PATENTS

| | | | |
|---|---|---|---|
| 921,312 | 5/1909 | Thwaites | 23—50 |
| 2,145,816 | 1/1939 | Stoops | 23—50 |
| 2,388,659 | 11/1945 | Ryan | 23—200 |
| 2,620,261 | 12/1952 | Toxby | 23—200 |
| 2,631,085 | 3/1953 | Bennetch | 23—200 |
| 2,746,840 | 5/1956 | Davis | 23—97 |
| 2,785,991 | 3/1957 | Bennetch | 23—200 |
| 2,866,686 | 12/1958 | Bennetch | 23—200 |
| 3,132,000 | 5/1964 | Dwyer et al. | 23—200 |
| 3,148,944 | 9/1964 | Van Dijk et al. | 23—97 |
| 3,198,603 | 8/1965 | MacCallum et al. | 23—200 |
| 3,259,571 | 7/1966 | Marshall et al. | 23—200 XR |
| 3,337,296 | 8/1967 | Hill | 23—97 |
| 3,395,983 | 8/1968 | Bennetch | 23—200 |

EDWARD STERN, Primary Examiner

U.S. Cl. X.R.

23—200